United States Patent
Sridhar et al.

(10) Patent No.: US 7,369,300 B2
(45) Date of Patent: May 6, 2008

(54) OPTICAL AMPLIFIER PRE-EMPHASIS AND EQUALIZATION METHOD AND OPTICAL COMMUNICATIONS SYSTEM INCORPORATING SAME

(75) Inventors: Balakrishnan Sridhar, Ellicott City, MD (US); Michael Y. Frankel, Baltimore, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 11/489,774

(22) Filed: Jul. 20, 2006

(65) Prior Publication Data

US 2008/0018990 A1 Jan. 24, 2008

(51) Int. Cl.
*H01S 4/00* (2006.01)
*H04B 10/12* (2006.01)

(52) U.S. Cl. .................... 359/337.13; 359/337.1

(58) Field of Classification Search ........... 359/337.1, 359/337.13

See application file for complete search history.

(56) References Cited

U.S. PATENT DOCUMENTS

| | | | |
|---|---|---|---|
| 5,225,922 A | 7/1993 | Chraplyvy et al. | |
| 6,359,726 B1* | 3/2002 | Onaka et al. | 359/337.1 |
| 6,731,424 B1 | 5/2004 | Wu | |
| 6,738,183 B2 | 5/2004 | Shigeharra | |
| 6,839,160 B2* | 1/2005 | Tsuda et al. | 359/337 |
| 6,956,687 B2* | 10/2005 | Moon et al. | 359/223 |
| 7,006,278 B2* | 2/2006 | Sakamoto et al. | 359/334 |
| 2002/0154359 A1* | 10/2002 | Tsuda et al. | 359/124 |
| 2003/0184843 A1* | 10/2003 | Moon et al. | 359/290 |
| 2005/0100271 A1* | 5/2005 | Frankel | 385/24 |

\* cited by examiner

*Primary Examiner*—Jack Keith
*Assistant Examiner*—Eric Bolda
(74) *Attorney, Agent, or Firm*—Clements Bernard Miller; Christopher L. Bernard; Tyler S. Brown (57) ABSTRACT

The present invention provides an optical amplifier pre-emphasis and equalization method that alleviates the optical amplifier gain ripple penalty experienced in conventional optical communications systems. This method includes storing measured communications channel signal gain ripple information, acquired during factory calibration, in the internal memory of each optical amplifier module. When the optical amplifiers are assembled into a chain, system software retrieves this communications channel signal gain ripple information from each optical amplifier module and computes the pre-emphasis or equalization required for each channel in order to obtain a flat SNR at a receiver. The method also includes measuring the ambient temperature of each optical amplifier module and applying a correction based on the expected change in gain response of each optical amplifier. The method further includes, for Raman amplifiers and the like, applying a fiber type, gain setting, GFF error, etc. correction based on the expected change in gain response of each optical amplifier. The method relies on using VOAs at the sources or DGEs/RBFs in the optical signal path to pre-emphasize or equalize the optical channels.

12 Claims, 9 Drawing Sheets

OPTICAL AMPLIFIER PRE-EMPHASIS AND EQUALIZATION METHOD AND OPTICAL COMMUNICATIONS SYSTEM INCORPORATING SAME

FIELD OF THE INVENTION

The present invention relates generally to the telecommunications and optical networking fields. More specifically, the present invention relates to an optical amplifier pre-emphasis and equalization method and an optical communications system incorporating the same. Advantageously, the optical amplifier pre-emphasis and equalization method of the present invention efficiently and cost-effectively alleviates the optical amplifier gain ripple penalty experienced in conventional optical communications systems.

BACKGROUND OF THE INVENTION

In optical communications systems that use wavelength division multiplexing (WDM), multiple wavelengths of light are used to support multiple communications channels on a single fiber. Optical amplifiers, such as erbium-doped fiber amplifiers (EDFAs), Raman amplifiers, and the like, are used in these optical communications systems to amplify optical signals that experience attenuation over multi-kilometer fiber optic links. Due to the length of such multi-kilometer fiber optic links, which may be on the order of hundreds or thousands of kilometers, many of these optical amplifiers may be used.

The intrinsic gain spectrum of an EDFA, for example, is not flat. Unless the signal spectrum is equalized, different wavelengths of light are amplified by different amounts as they propagate through multiple optical amplifiers. This results in degraded bit error rate (BER) performance for some communications channels. This degradation is referred to as the "optical amplifier gain ripple penalty." It comes from two different sources, namely erbium-doped fiber (EDF)/gain flattening filter (GFF) mismatch and the temperature dependent change in the gain spectrum of the optical amplifiers, and it is compounded by the use of many optical amplifiers, increasing linearly with the number of optical amplifiers used. The gain ripple penalty stems from the optical amplifiers and, to a lesser extent, from dispersion compensating modules (DCMs), the fiber plant, etc., and it is usually a reach-limiting constraint for an optical communications system.

Conventional approaches for alleviating the optical amplifier gain ripple penalty involve the use of a dynamic gain equalizer (DGE) or the like. The DGE has a loss spectrum that tracks the gain spectrum of the optical amplifiers, thereby introducing losses to offset gain peaks. Conventional approaches for alleviating the optical amplifier gain ripple penalty also involve the use of an optical performance monitor (OPM) or the like for the active measurement of communications channel signal gain ripple at a receiver or an intermediate point in the optical amplifier chain and a feedback mechanism to provide this communications channel signal gain ripple information to a controlling element, such as a variable optical attenuator (VOA), DGE, or the like. The drawback to these approaches is that OPM and DGE elements are relatively expensive, especially when used in low channel count optical communications systems.

Thus, what is needed in the art is an approach for alleviating the optical amplifier gain ripple penalty that does not necessarily use OPM and DGE elements, or feedback mechanisms, thereby limiting optical communications system cost.

BRIEF SUMMARY OF THE INVENTION

In various exemplary embodiments, the present invention provides an optical amplifier pre-emphasis and equalization method that efficiently and cost-effectively alleviates the optical amplifier gain ripple penalty experienced in conventional optical communications systems. This optical amplifier pre-emphasis and equalization method includes storing measured communications channel signal gain ripple information, acquired during factory calibration, in the internal memory of each optical amplifier module. When the optical amplifiers are assembled into a chain, system software retrieves this communications channel signal gain ripple information from each optical amplifier module and computes the pre-emphasis or equalization required for each channel in order to obtain a flat signal-to-noise ratio (SNR) at a receiver. The optical amplifier pre-emphasis and equalization method also includes measuring the ambient temperature of each optical amplifier module and applying a correction based on the expected change in gain response of each optical amplifier. The optical amplifier pre-emphasis and equalization method further includes, for Raman amplifiers and the like, applying a fiber type, gain setting, GFF error, etc. correction based on the expected change in gain response of each optical amplifier. The optical amplifier pre-emphasis and equalization method relies on using VOAs at the sources and/or DGEs/reconfigurable blocking filters (RBFs) that are already deployed at optical add/drop multiplexer (OADM) nodes in the optical signal path to pre-emphasize or equalize the optical channels. In other words, the gain ripple is corrected by pre-emphasizing the input spectrum of the in-line amplifier (ILA) chain, or equalizing points in between, thereby improving the SNR of weak channels and reducing non-linearity on the "hot" channels.

In one exemplary embodiment of the present invention, an optical amplifier pre-emphasis and equalization method for alleviating the optical amplifier ripple penalty experienced in an optical communications system, such as a WDM optical communications system carrying a plurality of channels or wavelengths, includes, using system software disposed outside of an optical amplifier module comprising an optical amplifier disposed within the optical amplifier module, retrieving gain ripple information related to the optical amplifier from a memory disposed within the optical amplifier module; using the system software, computing the pre-emphasis or equalization required for each channel or wavelength (or for the optical amplifier chain) in order to compensate for gain ripple using the retrieved gain ripple information; and, using one of a VOA, an RBF, and a DGE, pre-emphasizing or equalizing each channel or wavelength. The method also includes, using the system software, computing the pre-emphasis or equalization required for each channel or wavelength in order to obtain a flat SNR at a receiver using the retrieved gain ripple information.

The method further includes, using the system software, retrieving temperature dependent gain ripple information related to the optical amplifier from the memory disposed within the optical amplifier module. The method still further includes, using the system software, retrieving ambient temperature information related to the optical amplifier from a sensor disposed one of within and adjacent to the optical amplifier module. The method still further includes, using the system software, computing the pre-emphasis or equalization required for each channel or wavelength (or for the optical amplifier chain) in order to compensate for temperature dependent gain ripple using the retrieved temperature dependent gain ripple information and the retrieved ambient temperature information. The method still further includes, using the system software, retrieving other gain ripple information related to the optical amplifier from the memory disposed within the optical amplifier module. Finally, the method includes, using the system software, computing the pre-emphasis or equalization required for each channel or wavelength (or for the optical amplifier chain) in order to compensate for other gain ripple using the retrieved other gain ripple information.

In another exemplary embodiment of the present invention, an optical communications system, such as a WDM optical communications system carrying a plurality of channels or wavelengths, executing an optical amplifier pre-emphasis and equalization algorithm for alleviating the optical amplifier ripple penalty experienced in the optical communications system, includes system software disposed outside of an optical amplifier module comprising an optical amplifier disposed within the optical amplifier module, wherein the system software is operable for retrieving gain ripple information related to the optical amplifier from a memory disposed within the optical amplifier module; wherein the system software is also operable for computing the pre-emphasis or equalization required for each channel or wavelength (or for the optical amplifier chain) in order to compensate for gain ripple using the retrieved gain ripple information; and wherein the system software is further operable for, using one of a VOA, an RBF, and a DGE, pre-emphasizing or equalizing each channel or wavelength. The system software is further operable for computing the pre-emphasis or equalization required for each channel or wavelength in order to obtain a flat SNR at a receiver using the retrieved gain ripple information.

The system software is further operable for retrieving temperature dependent gain ripple information related to the optical amplifier from the memory disposed within the optical amplifier module. The system software is still further operable for retrieving ambient temperature information related to the optical amplifier from a sensor disposed one of within and adjacent to the optical amplifier module. The system software is still further operable for computing the pre-emphasis or equalization required for each channel or wavelength (or for the optical amplifier chain) in order to compensate for temperature dependent gain ripple using the retrieved temperature dependent gain ripple information and the retrieved ambient temperature information. The system software is still further operable for retrieving other gain ripple information related to the optical amplifier from the memory disposed within the optical amplifier module. Finally, the system software is operable for computing the pre-emphasis or equalization required for each channel or wavelength (or for the optical amplifier chain) in order to compensate for other gain ripple using the retrieved other gain ripple information.

BRIEF DESCRIPTION OF THE DRAWINGS

The present invention is illustrated and described herein with reference to the various drawings, in which like reference numbers denote like method steps or system components, as appropriate, and in which.

DETAILED DESCRIPTION OF THE INVENTION

As described above, conventional approaches for alleviating the optical amplifier gain ripple penalty involve the use of a gain equalization filter or the like. The gain equalization filter has a loss spectrum that tracks the gain spectrum of an optical amplifier, thereby introducing losses to offset gain peaks. Conventional approaches for alleviating the optical amplifier gain ripple penalty also involve the use of an OPM or the like for the active measurement of communications channel signal gain ripple at a receiver or an intermediate point in the optical amplifier chain and a feedback mechanism to provide this communications channel signal gain ripple information to a controlling element, such as a VOA, DGE, or the like. The drawback to these approaches is that OPM and DGE elements are relatively expensive, especially when used in low channel count optical communications systems.

In various exemplary embodiments, the present invention provides an optical amplifier pre-emphasis and equalization method that efficiently and cost-effectively alleviates the optical amplifier gain ripple penalty experienced in conventional optical communications systems. This optical amplifier pre-emphasis and equalization method includes storing measured communications channel signal gain ripple information, acquired during factory calibration, in the internal memory of each optical amplifier module. When the optical amplifiers are assembled into a chain, system software retrieves this communications channel signal gain ripple information from each optical amplifier module and computes the pre-emphasis or equalization required for each channel in order to obtain a flat SNR at a receiver. The optical amplifier pre-emphasis and equalization method also includes measuring the ambient temperature of each optical amplifier module and applying a correction based on the expected change in gain response of each optical amplifier. The optical amplifier pre-emphasis and equalization method further includes, for Raman amplifiers and the like, applying a fiber type, gain setting, GFF error, etc. correction based on the expected change in gain response of each optical amplifier. The optical amplifier pre-emphasis and equalization method relies on using VOAs at the sources or DGEs/RBFs in the optical signal path to pre-emphasize or equalize the optical channels. In other words, gain ripple is corrected by pre-emphasizing the input spectrum of the ILA chain, thereby improving the SNR of weak channels and reducing non-linearity on the "hot" channels.

As described above, the optical amplifier gain ripple penalty stems from the optical amplifiers and, to a lesser extent, from DCMs, the fiber plant, etc., and it is usually the limiting constraint for an optical communications system. All optical amplifiers use GFFs to flatten out their gain response as a function of wavelength. These GFFs do not perfectly equalize the gain response of the optical amplifiers perfectly due to physical and manufacturing constraints. Every optical amplifier has some residual gain ripple due to this imperfect gain response flattening. This residual gain ripple is unique to each optical amplifier, is largely deterministic, and varies little over the life of the optical amplifier.

Figure 1:
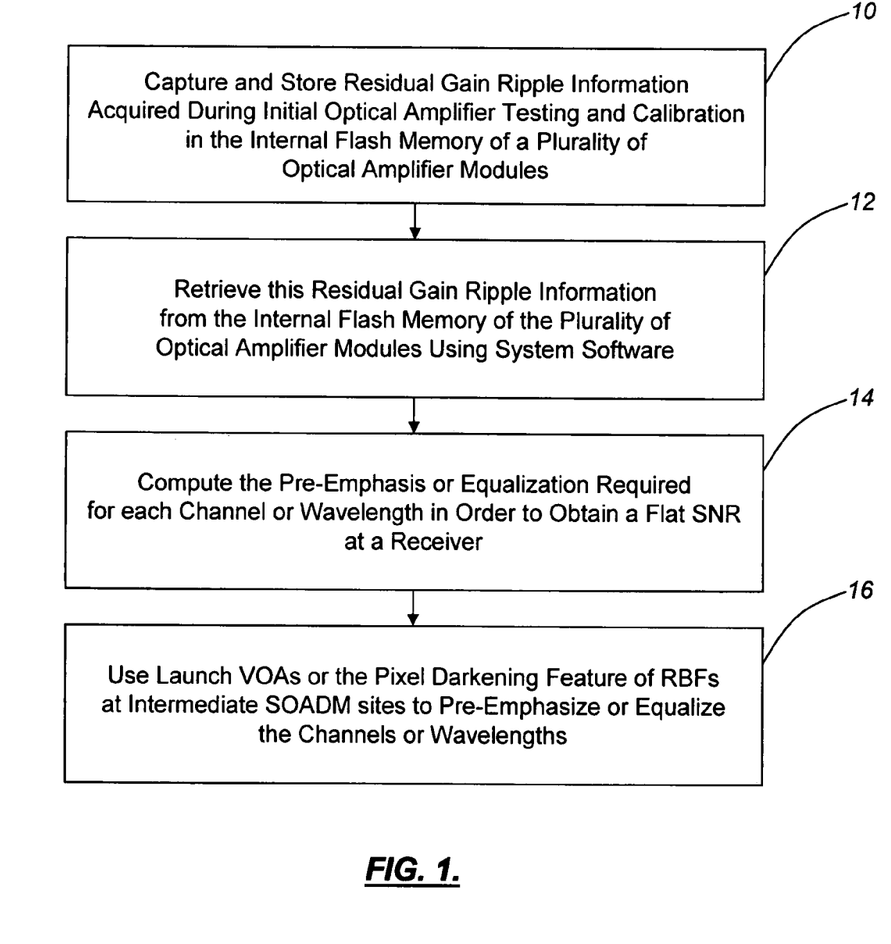
FIG. 1 is a flowchart illustrating one exemplary embodiment of the optical amplifier pre-emphasis and equalization method of the present invention (residual gain ripple embodiment)
Figure 2:
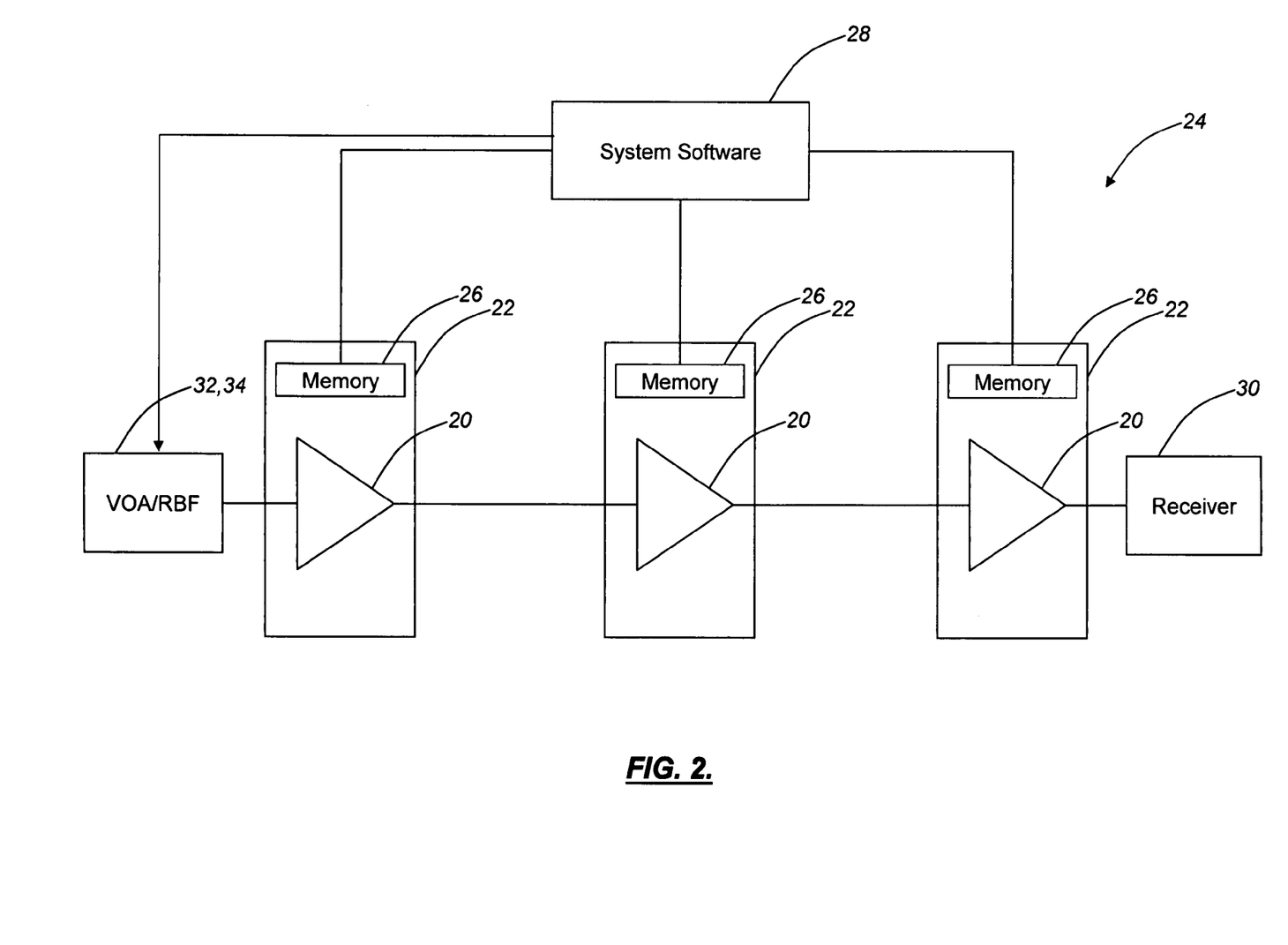
FIG. 2 is a schematic diagram illustrating one exemplary embodiment of an optical communications system operable for implementing the optical amplifier pre-emphasis and equalization method of FIG. 1.
Figure 8:
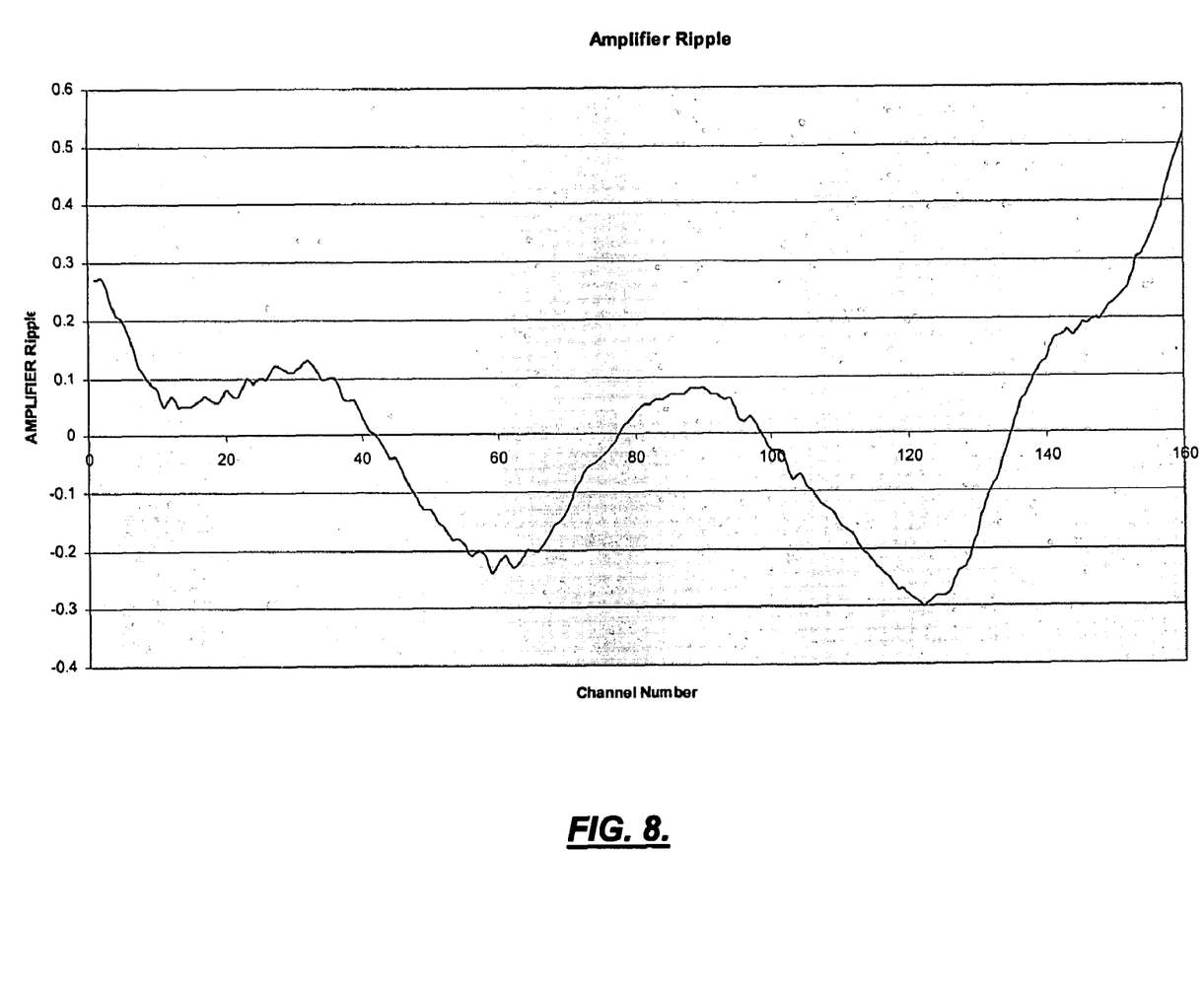
FIG. 8 is a plot illustrating exemplary residual gain ripple information.

Referring to FIGS. 1 and 2, given a plurality of optical amplifiers 20, such as EDFAs, Raman amplifiers, or the like, residing in a plurality of optical amplifier modules 22 associated with an optical communications system 24, residual gain ripple information acquired by a manufacturer during initial optical amplifier testing and calibration is captured and stored in each optical amplifier module's internal flash memory 26 (Block 10). This residual gain ripple information is illustrated, in an exemplary manner, in FIG. 8. When the optical amplifiers 20 are hooked in a chain, system software 28 running on the network control processor of a node retrieves this residual gain ripple information from each optical amplifier module's internal flash memory 26 (Block 12) and computes the pre-emphasis or equalization required for each channel or wavelength in order to obtain a flat SNR at a receiver 30 (Block 14). The system software 28 uses launch VOAs 32 or the pixel darkening feature of RBFs 34 at intermediate select optical add/drop multiplexer (SOADM) sites to pre-emphasize or equalize the channels or wavelengths (Block 16). Pre-emphasizing at launch provides mainly SNR equalization, while equalizing at the OADM nodes provides gain ripple equalization as well. In the launch VOA case, the Array Wave Guide (AWG) multiplexer/demultiplexer (MUX/DEMUX) card is used. It should be noted that any other suitable hardware/software component in communication with the system software 28 may be used to pre-emphasize or equalize the channels or wavelengths, including, for example, VOAs at the sources or DGEs/RBFs in the optical signal path.

Figure 3:
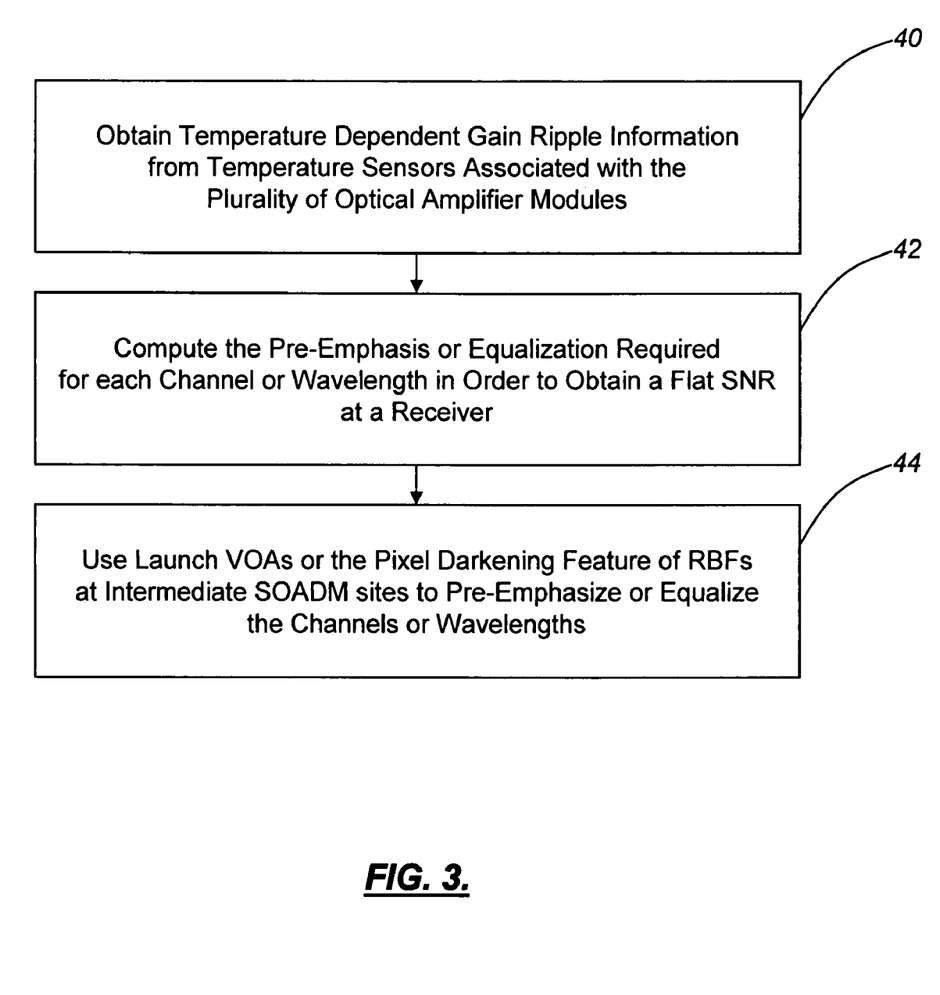
FIG. 3 is a flowchart illustrating another exemplary embodiment of the optical amplifier pre-emphasis and equalization method of the present invention (temperature dependent gain ripple embodiment)
Figure 4:
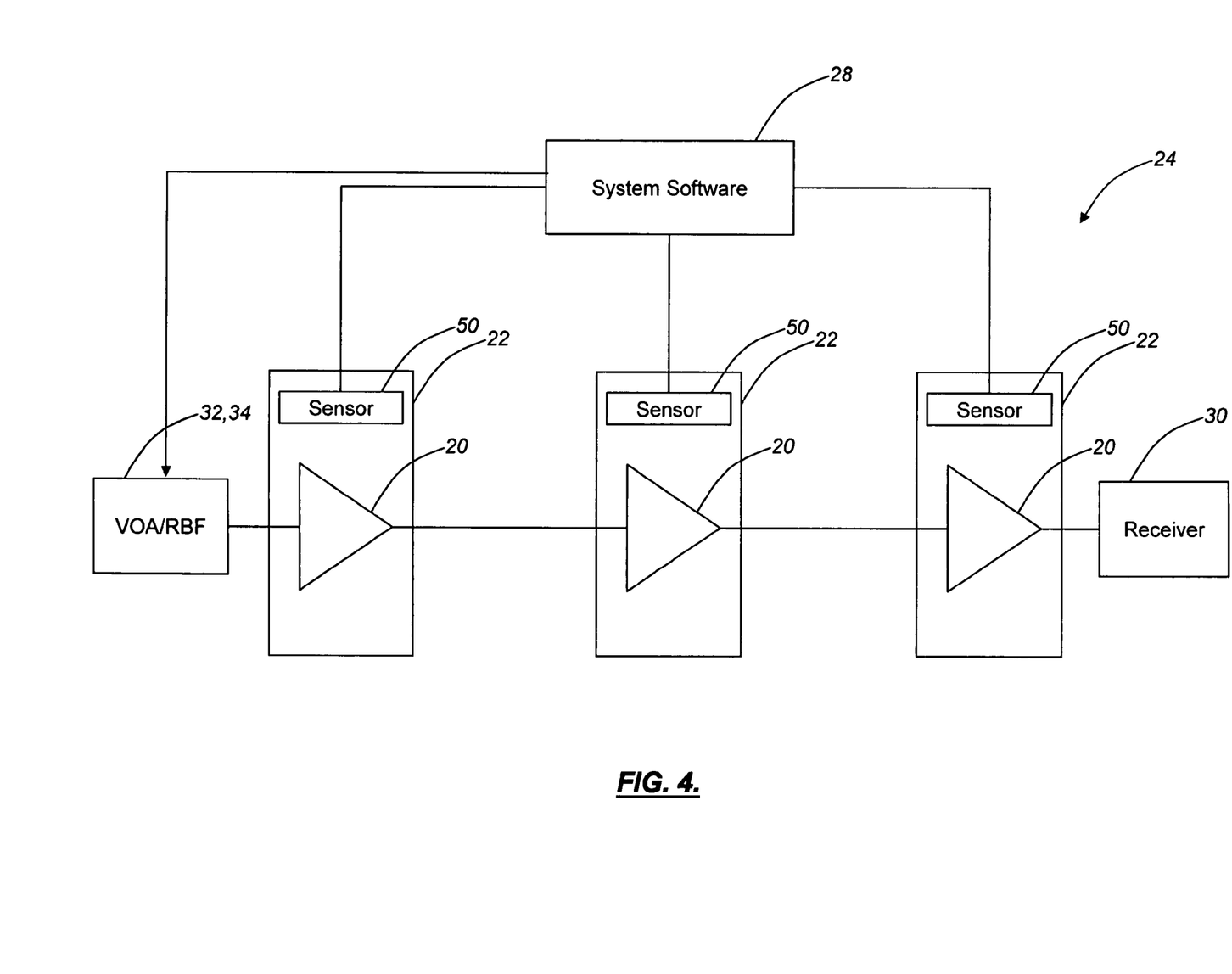
FIG. 4 is a schematic diagram illustrating one exemplary embodiment of an optical communications system operable for implementing the optical amplifier pre-emphasis and equalization method of FIG. 3.
Figure 9:
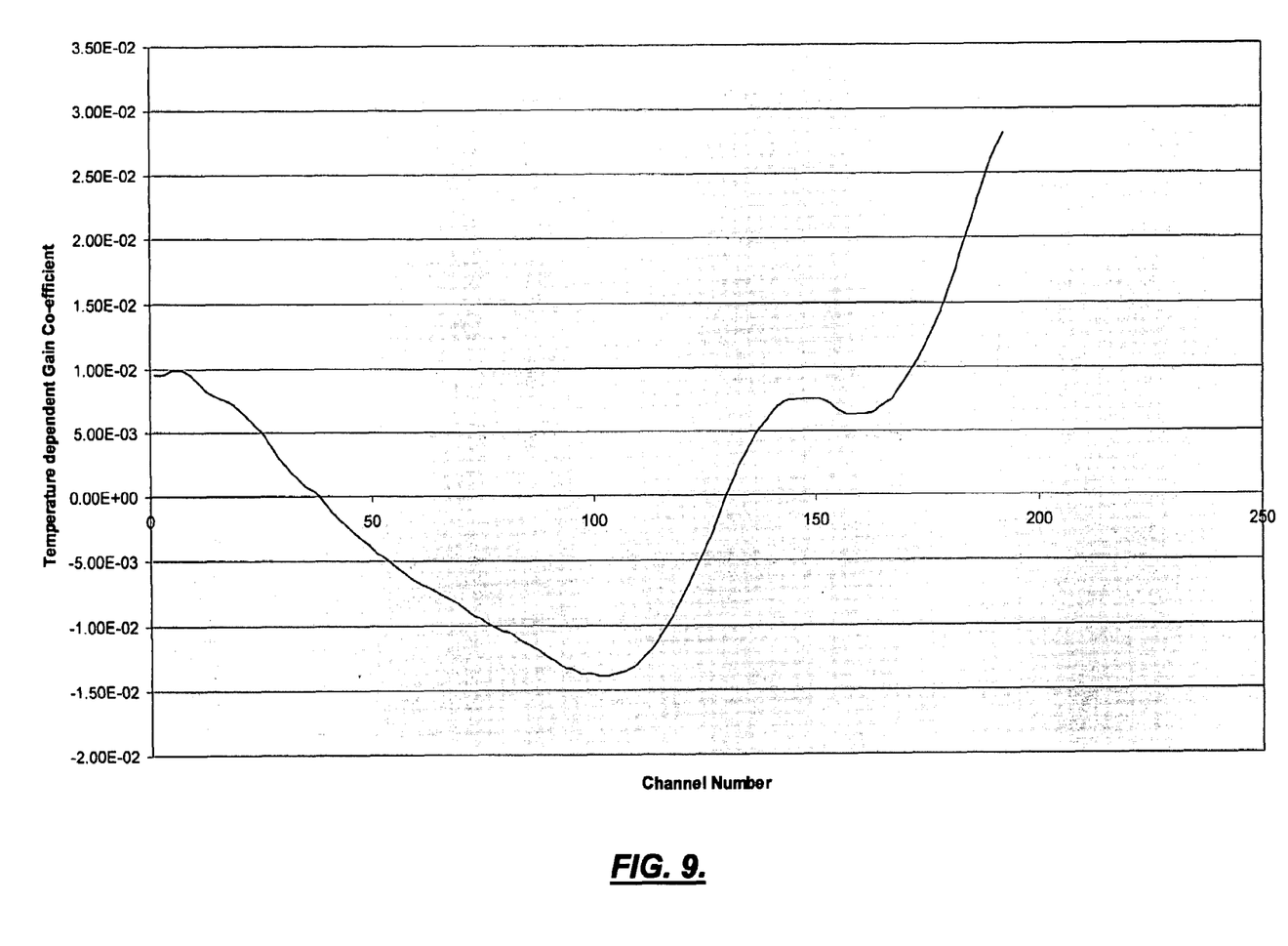
FIG. 9 is a plot illustrating exemplary temperature dependent gain ripple information.

The above approach allows for the compensation of other effects as well. Preferably, this compensation is combined with the above. Referring to FIGS. 3 and 4, given a plurality of optical amplifiers 20, such as EDFAs, Raman amplifiers, or the like, residing in a plurality of optical amplifier modules 22 associated with an optical communications system 24, temperature dependent gain ripple information is obtained from a temperature sensor 50 disposed within or adjacent to each optical amplifier module 22 (Block 40), as well as, optionally, each optical amplifier module's internal flash memory 26 (FIG. 2). This temperature dependent gain ripple information is illustrated, in an exemplary manner, in FIG. 9. Optical amplifier gain response varies predictably with changes in the temperature of the erbium coil, in the case of an EDFA, for example. In order to minimize this effect, the erbium coil is often held at an elevated temperature relative to the ambient temperature. This requires a heater, significantly increasing the power consumption of the optical amplifier module. Again, the system software 28 retrieves the temperature dependent gain ripple information from each temperature sensor 50 and computes the pre-emphasis or equalization required for each channel or wavelength in order to obtain a flat SNR at the receiver 30 (Block 42). The system software 28 resides as an on-board controller on the optical amplifier module and provides temperature effect data to the network control processor associated with a node. The system software 28 uses launch VOAs 32 or the pixel darkening feature of RBFs 34 at intermediate SOADM sites to pre-emphasize or equalize the channels or wavelengths (Block 44). The former case provides SNR equalization, while the latter case SNR and gain ripple equalization. In the launch VOA case, the AWG MUX/DEMUX card is used. Again, it should be noted that any other suitable hardware/software component in communication with the system software 28 may be used to pre-emphasize or equalize the channels or wavelengths, including, for example, VOAs at the sources or DGEs/RBFs in the optical signal path.

The following example is instructive. Given a plurality of optical amplifiers, AMP 1, AMP 2, AMP 3, . . . , AMP M, . . . , AMP N−2, AMP N−1, and AMP N, and considering a source channel ($C_k$) added at AMP 1 (source) and dropped at AMP N (sink), where the source and sink can be end nodes, add/drops (ADs), or select terminals, each optical amplifier has a gain ripple spectrum $G_M(C)$ and $T_M(C)$. $G_M(C)$ is the gain ripple as a function of channel number and is defined by and stored in AMP M. $T_M(C)$ is calculated for each amplifier based on the ambient temperature read-back for AMP M. The correction applied to the VOA for channel $C_k$ is given by:

$$W_k = -1/(N-1) * \{(G_1(C_k)+T_1(C_k))*(N-1)+(G_2(C_k))*(N-2)+ \ldots (G_M(C_k)+T_M(C_k))*(N-M)+ \ldots (G_{N-1}(C_k)+T_{N-1}(C_k))*(1)+(G_N(C_k)+T_N(C_k))*(N-N)\},$$

where $W_k$ is the attenuation applied to channel $C_k$ at the MUX VOA (source) at AMP 1 in order to equalize channel $C_k$ at AMP N. $W_k$ can be positive or negative.

The following example is also instructive. Channel $C_k$ passes through multiple SOADM/DGE (equalizing) nodes that are used to equalize channel $C_k$. If there are I equalizing nodes in the system located at $n_1, n_2, n_3, \ldots, n_I$ nodes, respectively, where $n_1=1$ and I<N, I different weights can be calculated for channel $C_k$ corresponding to each node. These weights are given by:

$$W_{n_1} = -1/(N-n_1) * \{(G_1(C_k)+T_1(C_k))*(N-1) + \ldots (G_{n_2-1}(C_k)+T_{n_2-1}(C_k))*(N-n_2+1)\}$$

$$W_{n_2} = -1/(N-n_2) * \{(G_{n_2}(C_k)+T_{n_2}(C_k))*(N-n_2) + \ldots (G_{n_3-1}(C_k)+T_{n_3-1}(C_k))*(N-n_3+1)\}$$

$$W_{n_I} = -1/(N-n_I) * \{(G_{n_I}(C_k)+T_{n_I}(C_k))*(N-n_2) + \ldots (G_{N-1}(C_k)+T_{N-1}(C_k))*(1)\}$$

The weights satisfy the relationship:

$$W_T = 1/(N-1) * \{(N-n_1)*W_{n1} + (N-n_2)*W_{n2} + (N-n_3)W_{n3} + \ldots (N-n_I)*W_{nI}\}.$$

This is the ideal distribution of the equalizing weights for the VOAs and the RBFs. However, these equalizing weights may have to be redistributed if there is not enough dynamic range for the VOAs or the RBFs. The gain ripple values $G_1 \ldots G_n$ are based on amplifier type (ILA-2, ILA-2 with Raman amplifier, etc.) and correspond to the gain ripple that channel $C_k$ experiences through the optical amplifier chain due to optical amplifier ripple and temperature variations. The gain ripple that channel $C_k$ experiences is normalized with respect to the mean gain of the optical amplifier. A positive value corresponds to a higher gain at the wavelength as compared to the mean gain, and a negative value corresponds to a lower gain at the wavelength as compared to the mean gain. Optionally, in a working system, this calculation is performed only time, three times in a modeling case: $G_1 \ldots G_n = 0$ (corresponding to the mean value), $G_1 \ldots G_n$=maximum (corresponding to the high value), and $G_1 \ldots G_n$=minimum (corresponding to the low value). The pre-emphasis weights $W_{n1} \ldots W_{nI}$ are zero for the mean case, negative (channels are attenuated) for the high case, and positive (channels are amplified) for the low case. Any tilt in the amplifier due to high span loss will apply equally in all three cases.

Figure 5:
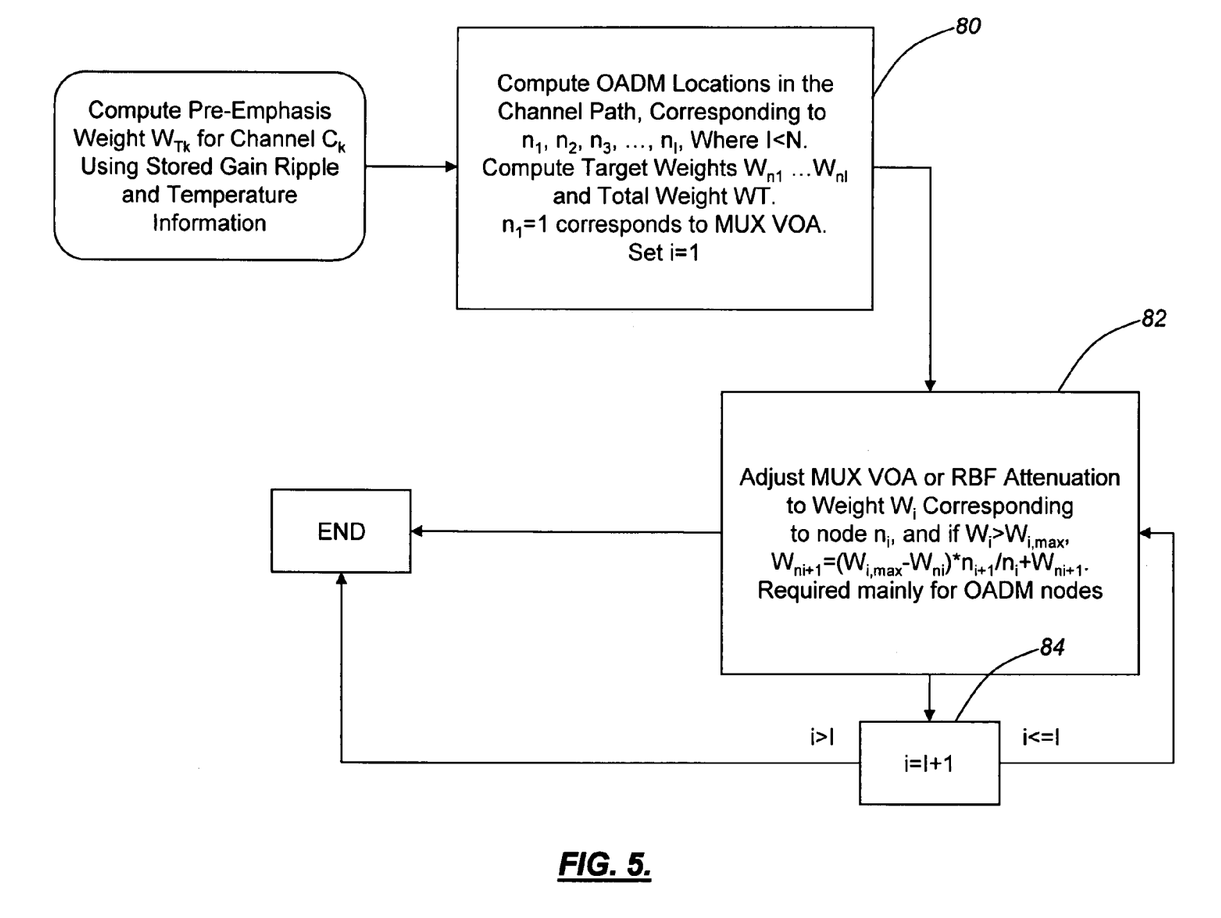
FIG. 5 is a flowchart illustrating one exemplary embodiment of the VOA/RBF equalization method of the present invention.

FIG. 5 illustrates this VOA and RBF equalization in the system. The algorithm reduces SNR gain ripple due to systematic amplifier ripple to zero and minimizes power ripple. The pre-emphasis weight $W_{Tk}$ for channel $C_k$ is computed using stored gain ripple and temperature information by, first, computing OADM locations in the channel path, the OADM locations corresponding to $n_1$, $n_2$, $n_3$, ..., $n_I$, where I<N, and computing target weights $W_{n1}$, $W_{n2}$, $W_{n3}$, ..., $W_{nI}$ and total weight $W_T$ (Block 80). $n_1 = 1$ corresponds to MUX VOA. Next, MUX VOA or RBF attenuation is adjusted to weight $W_i$ corresponding to node $n_i$, and if $W_i > W_{i,max}$, $W_{ni+1} = (W_{i,max} - W_{ni})*n_{i+1}/n_i + W_{ni+1}$ (Block 82). $W_{i,max}$ is the maximum weight that can be set at node I, limited by the dynamic range of the VOA/RBF, transmitter launch power, etc. In addition, some add/drop nodes may not have a wavelength blocker. In such cases, equalization is performed at a downstream node where a wavelength blocker is available. Finally, i is advanced (Block 84).

The pre-emphasis and equalization algorithm is a single pass algorithm. The pre-emphasis and equalization weights are calculated from the launch side for each sub-span. Any under-equalization at an upstream sub-span is optimized at a downstream sub-span, if RBF margin is available.

Figure 6:
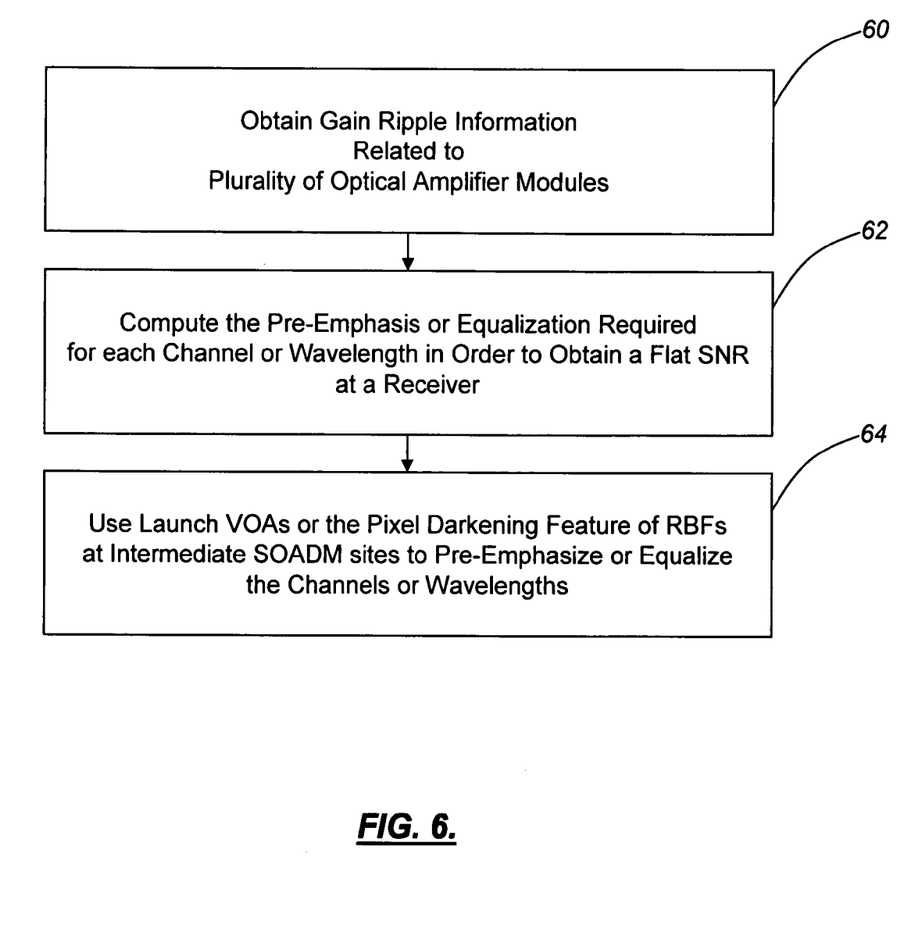
FIG. 6 is a flowchart illustrating a further exemplary embodiment of the optical amplifier pre-emphasis and equalization method of the present invention (other gain ripple embodiment)
Figure 7:
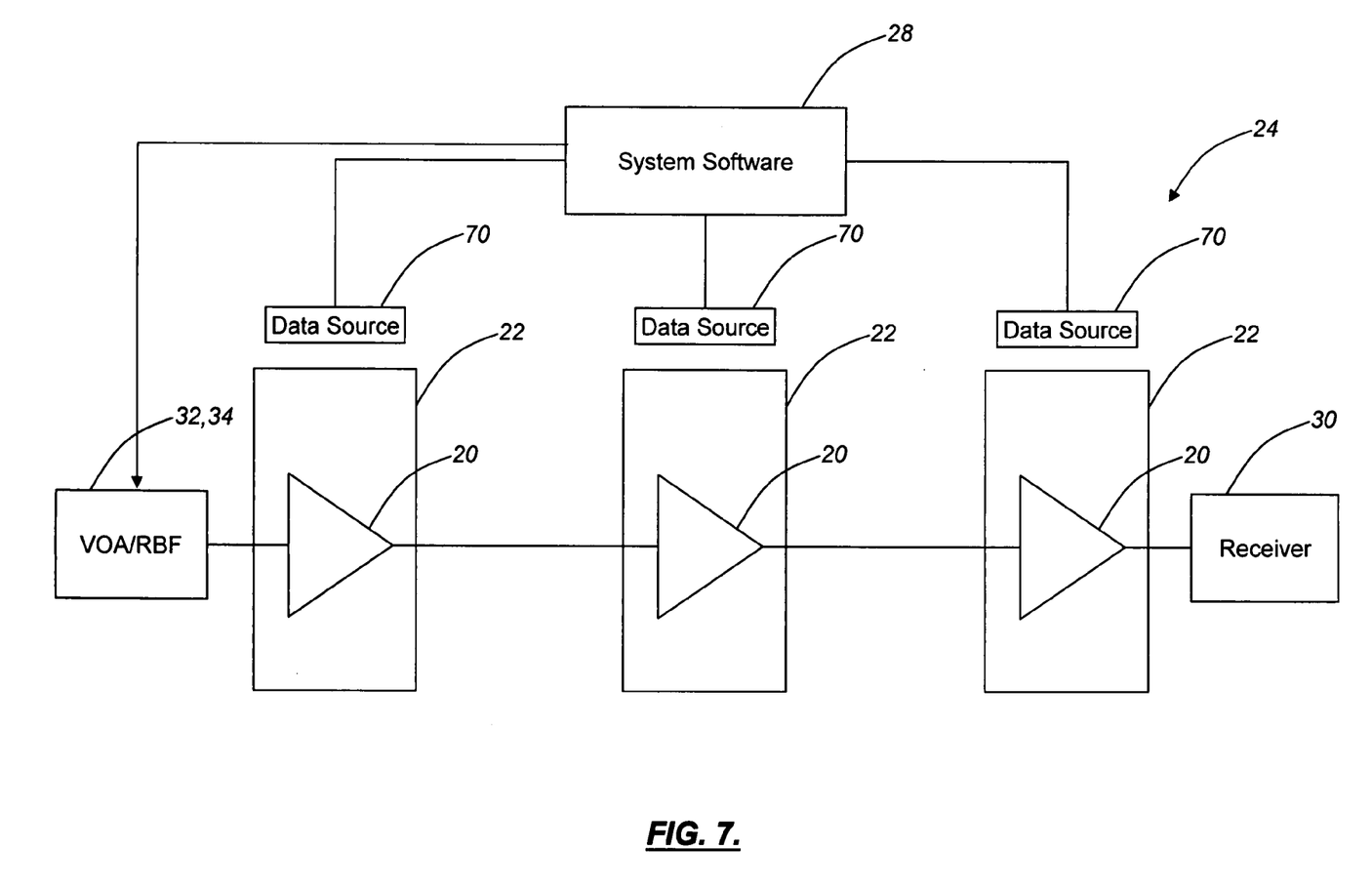
FIG. 7 is a schematic diagram illustrating one exemplary embodiment of an optical communications system operable for implementing the optical amplifier pre-emphasis and equalization method of FIG. 6.

The above approach allows for the compensation of other effects as well, such as fiber type, gain setting, GFF error, etc. Preferably, this compensation is combined with the above. For example, the ripple contribution from a Raman amplifier is a function of fiber type and gain setting, in addition to the residual ripple from the GFF. The effects are deterministic and the optical amplifier ripple can be compensated using the above techniques. Referring to FIGS. 6 and 7, given a plurality of optical amplifiers 20, such as EDFAs, Raman amplifiers, or the like, residing in a plurality of optical amplifier modules 22 associated with an optical communications system 24, other gain ripple information is obtained from a data source 70 associated with each optical amplifier module 22 (Block 60), as well as, optionally, each optical amplifier module's internal flash memory 26 (FIG. 2). Again, the system software 28 retrieves the other gain ripple information from each data source 70 and computes the pre-emphasis or equalization required for each channel or wavelength in order to obtain a flat SNR at the receiver 30 (Block 62). The system software 28 uses launch VOAs 32 or the pixel darkening feature of RBFs 34 at intermediate SOADM sites to pre-emphasize or equalize the channels or wavelengths (Block 64). The former case provides SNR equalization, while the latter case SNR and gain ripple equalization. In the launch VOA case, the AWG MUX/DEMUX card is used. Again, it should be noted that any other suitable hardware/software component in communication with the system software 28 may be used to pre-emphasize or equalize the channels or wavelengths, including, for example, VOAs at the sources or DGEs/RBFs in the optical signal path.

Advantageously, the optical amplifier pre-emphasis and equalization method of the present invention does not require any hardware components that are not already part of the optical communications system and provides a 30 to 50% improvement in the reach of long haul optical communications systems.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical amplifier pre-emphasis and equalization method for alleviating the optical amplifier ripple penalty experienced in an optical communications system, such as a wavelength division multiplexing (WDM) optical communications system carrying a plurality of channels or wavelengths, the method comprising:

capturing and storing residual gain ripple information related to an optical amplifier within memory disposed within an optical amplifier module, wherein the capturing and storing is performed during factory calibration;

using system software disposed outside of the optical amplifier module comprising the optical amplifier disposed within the optical amplifier module, retrieving the residual gain ripple information related to the optical amplifier from the memory disposed within the optical amplifier module;

using the system software, computing the pre-emphasis or equalization required for each channel or wavelength in order to compensate for residual gain ripple using the retrieved residual gain ripple information; and using at least one of a variable optical attenuator (VOA), a reconfigurable blocking filter (RBF), and a dynamic gain equalizer (DGE), pre-emphasizing or equalizing each channel or wavelength.

2. The method of claim 1, wherein the residual gain ripple information is captured during one of optical amplifier manufacturing and testing.

3. The method of claim 1, further comprising, using the system software, computing the pre-emphasis or equalization required for each channel or wavelength in order to obtain a flat signal-to-noise ratio (SNR) at a receiver using the retrieved residual gain ripple information.

4. The method of claim 1, wherein the VOA comprises a launch VOA disposed at a channel or wavelength source.

5. The method of claim 1, wherein the RBF comprises an RBF incorporating a pixel darkening feature disposed at an intermediate optical add/drop multiplexer site in the optical communication system.

6. The method of claim 1, wherein the DGE comprises a DGE disposed at an intermediate optical add/drop multiplexer site in the optical communication system.

7. The method of claim 1, further comprising, using the system software, retrieving temperature dependent gain ripple information related to the optical amplifier from the memory disposed within the optical amplifier module.

8. The method of claim 7, further comprising, using the system software, retrieving ambient temperature information related to the optical amplifier from a sensor disposed one of within and adjacent to the optical amplifier module.

9. The method of claim 8, further comprising, using the system software, computing the pre-emphasis or equalization required for each channel or wavelength in order to compensate for temperature dependent gain ripple using the retrieved temperature dependent gain ripple information and the retrieved ambient temperature information.

10. The method of claim 1, further comprising, using the system software, retrieving other gain ripple information related to the optical amplifier from the memory disposed within the optical amplifier module.

11. The method of claim 10, further comprising, using the system software, computing the pre-emphasis or equalization required for each channel or wavelength in order to compensate for other gain ripple using the retrieved other gain ripple information.

12. The method of claim 10, wherein the other gain ripple information comprises one or more of fiber type gain ripple information, gain setting gain ripple information, gain flattening filter (GFF) gain ripple information, and gain ripple information related to other optical elements.

* * * * *